Feb. 8, 1966  W. SCHWARZMAYR ETAL  3,233,908
WORK HOLDER FOR MACHINE TOOLS
Filed Oct. 8, 1964  2 Sheets-Sheet 2

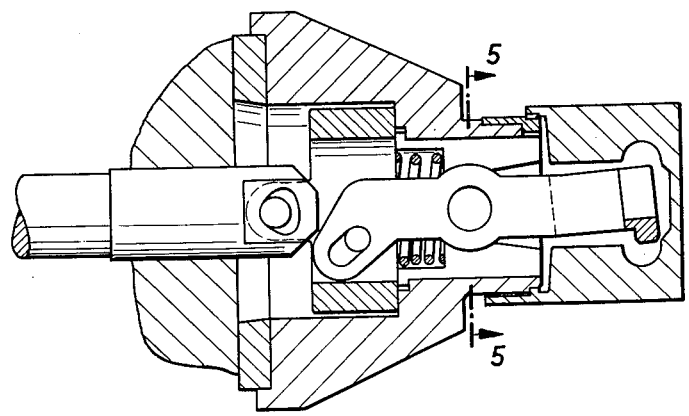
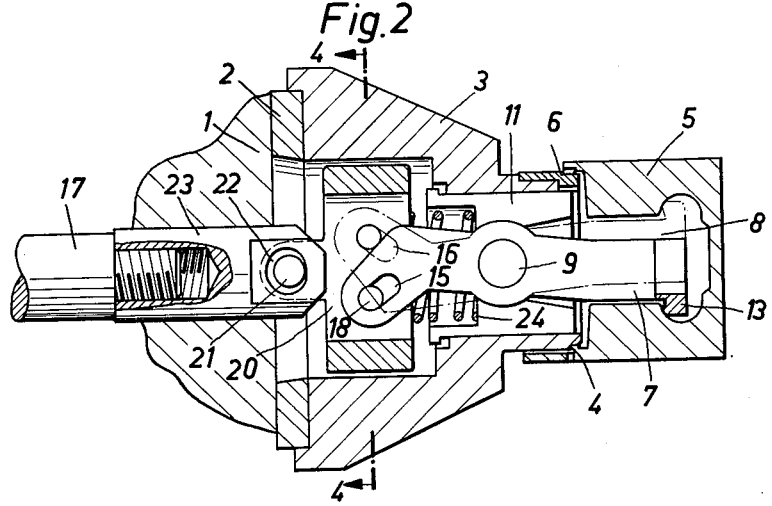

Inventors
Walter Schwarzmayr
Julius Beusing
Werner Tietze
by Michael J. Striker

United States Patent Office 3,233,908
Patented Feb. 8, 1966

3,233,908
WORK HOLDER FOR MACHINE TOOLS
Walter Schwarzmayr, Penzendorf, near Schwabach, Julius Beusing, Goslar, and Werner Tietze, Bielefeld, Germany, assignors to Werkzeugmaschinenfabrik Gildemeister & Co. A.G., Bielefeld, Germany
Filed Oct. 8, 1964, Ser. No. 402,655
Claims priority, application Germany, Oct. 11, 1963, W 35,406
8 Claims. (Cl. 279—2)

The present invention relates to machine tools.

More particularly, the present invention relates to work holders for machine tools, and especially to work holders capable of supporting work which has an irregular inner surface in such a way that the exterior surface of the work is exposed for machining. Work holders of this type are particularly useful in connection with the machining of the exterior surfaces of pistons where it is necessary to hold the pistons with structure extending into the interior of the pistons and engaging, for example, the wrist pin openings of the pistons.

At the present time it is necessary to machine the wrist pin openings before the piston is machined at its exterior so as to provide at the wrist pin openings surfaces which can be properly engaged by elements which maintain the work on the work support of the work holder. Because these latter elements are required to press with such great force against the work, the machined surfaces very often are permanently deformed by the work-engaging elements of the work holder, particularly where the pistons are made of relatively soft metal so that the work-engaging elements form depressions in the metal due to the pressure thereagainst. The result is that after the work is machined at its exterior it is necessary to machine for a second time the surfaces which were engaged by the elements of the work holder. Moreover, because the work-engaging elements of the work holder have precise positions for engaging the work it is necessary for the work surfaces which are engaged to be very precisely machined. If there is a sufficient lack of precision at these machined surfaces only one of a pair of work-engaging elements, for example, will engage and hold the work on the work holder, with the result that an insecure mounting of the work on the work holder cannot be avoided.

A primary object of the present invention, therefore, is to provide a work holder which will avoid the above drawbacks.

In particular, it is an object of the invention to provide for a work holder, work-engaging elements which are capable of independently orienting themselves with respect to the work surfaces which they engage so that on the one hand these work surfaces need not be machined before the work is mounted on the work holder and on the other hand even though these surfaces of the work, which are engaged by the work holding elements, are not precisely situated at a given location on the work, nevertheless the work can be securely mounted on the work holder.

A further problem which is encountered in the prior art is that chips, liquid such as the cooling liquid, lubricants, and the like have free access to the interior of the work holder providing an undesirable wear of the movable components thereof and greatly reducing the life span of the work holder.

Accordingly, it is a further object of the present invention to provide a work holder which will reliably prevent foreign bodies or liquids from having access to the interior of the work holder.

In addition, it is an object of the invention to provide for a work holder of the above type a structure which can precisely locate the work-engaging elements in predetermined initial positions even though these elements are independently movable to locations which have no relationship with respect to each other in order to engage different surfaces of the work.

Furthermore, it is an object of the invention to provide a structure capable of accomplishing all of the above objects and at the same composed of simple rugged elements which are very reliable in operation.

With the above objects in view the invention includes, in a work holder for machine tools, a work support means on which the work is adapted to be placed with the exterior of the surface of the work exposed for machining, this work support means being formed with an opening passing therethrough. A pair of work-engaging members are situated in this opening of the work support means and are adapted to engage the work at different locations thereof for holding the work on the work support means. A pair of mounting means are also located in the opening of the work support means, and the pair of mounting means respectively mount the pair of work-engaging members for movement independently of each other in the direction of the axis of a rotary spindle which carries the work support means, and a pulling means is provided for pulling the work-engaging members independently of each other in the direction of the spindle axis into engagement with the work so as to reliably hold the latter against the work support means even if the surfaces of the work which are engaged by the work-engaging members do not have any particular relationship with respect to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal sectional illustration of one possible embodiment of a work holder according to the present invention, the work holder being shown in FIG. 1 in a work-releasing position;

FIG. 2 shows the structure of FIG. 1 in a work holding position, FIG. 2 also showing a second work-engaging member in addition to that one which is visible in FIG. 1, this second work-engaging member being shown in dot-dash lines in FIG. 2;

Figure 3:
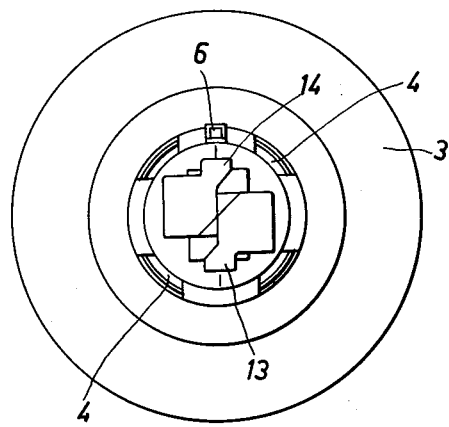
FIG. 3 is an end view of the work holder of FIG. 2, as viewed from the right of FIG. 2 with the work removed.

Referring now to the drawings, and in particular to FIGS. 1 and 2, there is fragmentarily illustrated therein a rotary machine tool spindle 1 of conventional construction fixedly carrying a ring 2 on which is fixedly mounted a work support means 3, the work support means 3 being, for example, bolted to the ring 2 which is in turn rigidly fixed with the spindle 1.

The work support means 3 has an opening passing therethrough along the spindle axis and is of a generally stepped tubular configuration. At its front end, situated at the right in FIGS. 1 and 2, the work support means 3 is provided with an interrupted centering flange 4 adapted to extend into and engage the open end of a piston 5 so as to support the latter with its axis coinciding with the spindle axis. The interrupted construction of the flange 4 is particularly apparent from FIG. 3 which indicates that the flange 4 has four portions equally spaced from each other to engage the open end of the piston 5 which forms the work in the particular example illustrated. The inner ring of the piston 5 which engages the segments of the flange 4 is formed at one location with a notch which receives a motion transmitting member 6 which is fixed to the work support 3, so that in this way the piston 5 is constrained to rotate with the work support means 3 and the spindle 1.

Figure 4:
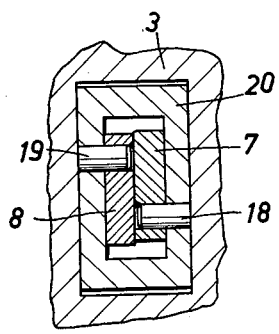
FIG. 4 is a transverse section of the structure of FIG. 2 taken along the line 4—4 of FIG. 2 in the direction of the arrows.

In order to hold the work 5 on the work support means 3 the opening of the latter accommodates a pair of work-engaging members 7 and 8 in the form of levers having elongated free end portions adapted to extend into the hollow interior of the work and provided with projections 13 and 14, respectively (FIG. 3), for extending into the wrist pin recesses of the piston, as is particularly apparent from FIG. 2. The work-engaging levers 7 and 8 are symmetrically arranged and are carried by a pair of mounting means which respectively include pivot pins 9 and 10 respectively extending into openings of the levers 7 and 8 (FIG. 5), so as to support the latter for independent turning movement. The pair of mounting means includes in addition to the pivot pins 9 and 10 a pair of mounting members 11 and 12 of half-cylindrical configuration and respectively fixedly carrying the pivot pins 9 and 10. When the free ends of the levers 7 and 8 are turned apart from each other the projections 13 and 14 enter into the wrist pin recesses of the work 5. The levers 7 and 8 are formed at their ends distant from the work with elongated slots 15 and 16, respectively, these slots being inclined oppositely with respect to each other and extending at an acute angle with respect to the axis of the pull rod assembly 17 described in greater detail below, this latter axis coinciding with the spindle axis. The pull rod assembly 17 forms part of a pulling means for pulling the work-engaging members 7 and 8 in the direction of the spindle axis toward the left, as viewed in FIGS. 1 and 2, so as to press the projections 13 and 14 against surfaces of the work 5 in the interior recesses thereof, and this pulling means includes a pair of pins 18 and 19 (FIGS. 2 and 4) which respectively extend into the slots 15 and 16 and which are carried by a carrier member 20 of the pulling means, this carrier member 20 being situated in the opening of the work support means 3 with a clearance sufficient to provide free tilting of the carrier member 20. The carrier member 20 fixedly carries a third pin 21 which extends across the spindle axis and which is received in an opening 22 of the pull rod assembly 17. This assembly includes in addition to the pull rod per se a fitting 23 fixedly connected to the end of the pull rod so as to form an extension thereof, and it is this fitting 23 which is formed with the opening 22 which receives the pin 21. The portion of the fitting 23 which is formed with the opening 22 extends between extensions of the carrier member 20 which fixedly carry the pin 21, and this portion of the fitting 23 has flat surfaces slidably engaged by those extensions of the carrier member 20 so that the latter is freely tiltable relative to the fitting 23. As is particularly apparent from FIGS. 1 and 2, the opening 22 is of a substantially kidney-shaped configuration having a substantially straight portion at its right side, as viewed in FIGS. 1 and 2, and a substantially V-shaped portion at its left side, as viewed in FIGS. 1 and 2. As a result when the assembly 17 is displaced to the left, as viewed in FIG. 2, by any suitably known structure, such as a suitable spring engaging a shoulder of the pull rod, the pin 21 can displace itself along the straight side of the opening 22 in accordance with any tilting movement of the carrier member 20. On the other hand, when the work holding means is in its release position shown in FIG. 1, the work holding means being placed in this position, for example, by any suitable cam which engages the free end of the pull rod and displaces it to the right, as viewed in FIG. 1, in opposition to the spring which displaces it to the left, the V-shaped side of the opening 22 engages the pin 21 to precisely situate the latter with its axis intersecting the spindle axis, and at this time the right end of the carrier member 20, as viewed in FIG. 1, engages an inner shoulder of the work support means 3, so that in this way the carrier member 20 will be centered when the work holder of the invention is placed in its work-releasing position. In the release position of FIG. 1 all of the movable components within the work support means 3 are displaced by the pull rod assembly 17 to the right, as viewed in FIG. 1. In this position the operator can place the work in engagement with the work support means 3, and then the pull rod assembly can be released to a spring or the like which displaces it to the left so as to displace the work-engaging members 7 and 8 into engagement with the work, as shown in FIG. 2, and the projections 13 and 14 will press against the work urging it into engagement with the work support means 3.

A spring means 24 is situated between and engages the pair of mounting means 11 and 12, on the one hand, and the carrier member 20, on the other hand, so as to urge the latter away from the pair of mounting means 11 and 12, and therefore during the initial part of the movement of the structure from the position of FIG. 1 into the position of FIG. 2 the spring 24 will contribute to the movement of the carrier member 20 to the left, while the half cylinders 11 and 12 remain substantially stationary at their initial positions. Because of the movement of the carrier member 20 away from the half cylinders 11 and 12, the pins 18 and 19 are displaced along the slots 15 and 16, respectively, and thus turn the outer free ends of the work-engaging levers 7 and 8 apart from each other. When the projections 13 and 14 engage the work or when the pins 18 and 19 reach the left ends of the slots 15 and 16, respectively, as viewed in FIGS. 1 and 2, the relative movement between the carrier member 20 and the half cylinders 11 and 12 is terminated, and now the continued force pulling the pins 18 and 19 to the left, as viewed in FIGS. 1 and 2, presses the projections 13 and 14 against the work and reliably holds it on the work support means 3. Of course, in order to release the work, the pull rod assembly 17 is simply displaced back to the position of FIG. 1 and all the work returned to their initial positions.

In order to enable both of the projections 13 and 14 to press effectively against the work surfaces which are not precisely situated with respect to each other and with respect to the work support means 3, the pair of mounting means 11 and 12 are capable of movement independently of each other along the spindle axis. Thus, as is particularly apparent from FIG. 5, the half cylinders 11 and 12 have flat faces which slidably engage each other, and the pivot pins 9 and 10 as well as the levers 7 and 8 also have flat faces flush with the flat faces of the half cylinders 11 and 12 and in slidable engagement with each other so that the work-engaging elements 7 and 8 are capable of independently orienting themselves in accordance with the particular location of the work surfaces engaged thereby longitudinally of the spindle axis. Therefore, the pair of work-engaging members 7 and 8 need not be displaced by equal distances along the spindle axis and thus can independently press with full force against the work to reliably hold the latter on the work support means 3, and thus it becomes unnecessary to machine the work surfaces which are to be engaged by the projections 13 and 14. Due to the free tiltability of the carrier member 20 a uniform pressing of the projections 13 and 14 against the work can be achieved even though the elements 7 and 8 are displaced by different distances along the spindle axis. The carrier member 20 will tilt about that one of the pins 18 and 19 which engages that one of the levers 7 and 8 which first engages a work surface. The straight side of the opening 22 permits the free tilting of the carrier member 20 at this time, and on the other hand the member 20 is properly centered in the work release position as shown in FIG. 1 and described above.

Figure 5:
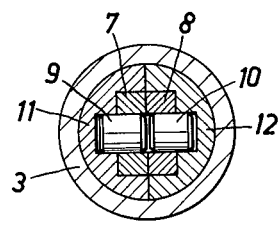
FIG. 5 is a transverse section of the structure of FIG. 1 taken along the line 5—5 of FIG. 1 in the direction of the arrows.

As is apparent particularly from FIGS. 1, 2 and 5, the pair of half cylinders 11 and 12 are formed at their flat faces with recesses having peripheries which extend along circles, and the levers 7 and 8 have intermediate circular portions received in and filling these recesses, and of course the pins 9 and 10 are positioned centrally with respect to the circular recesses of the half cylinders and the circular portions of the levers 7 and 8, respectively. As a result of this construction, it will be seen that in the plane of FIG. 5, which is to say a plane normal to the spindle axis and including the common axis of pins 9 and 10 when the structure is in its release position of FIG. 1, the opening of the work support means 3 is completely filled, so that in this way the interior of the work support means 3 is protected against entry of chips, cooling liquids, and the like, so that the interior of the work support means 3 is reliably maintained clean and at optimum operating conditions.

It will be understood that each of the elements described above, or two or more together, may also find a useful application in other types of machine tools differing from the types described above.

While the invention has been illustrated and described as embodied in work holders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a work holder for machine tools, in combination, a rotary spindle; work support means connected to said spindle for rotation therewith, said work support means being adapted to support work with the exterior surface thereof exposed so as to be accessible for machining, and said work support means being formed with an opening passing therethrough; a pair of work-engaging members extending into said opening of said work support means and being adapted to engage the work at a pair of different locations thereof for maintaining the work on said work support means; a pair of independent mounting means also extending into said opening of said work support means and respectively mounting said work-engaging members for movement independently of each other in a direction parallel to the axis of said spindle, so that one work-engaging member and the mounting means which carries the same form a pair of components of one assembly and the other of said work-engaging members and the mounting means therefor form a pair of components of a second assembly; and pulling means respectively operatively connected to one of the components of each assembly for pulling the assembly in the direction pressing said work-engaging members against the work to maintain the latter on said work support means, whereby said assemblies are movable through different distances until both of said work-engaging members engage and press against the work.

2. In a work holder as recited in claim 1, said work-engaging members being in the form of levers respectively having free ends which are respectively provided with projections which are adapted to extend into recesses of the work for engaging the latter, and said pair of mounting means respectively mounting said levers for turning movement independently of each other.

3. In a work holder as recited in claim 2, said levers respectively having end portions distant from said free ends thereof and formed with elongated slots which are inclined oppositely to each other along an acute angle with respect to the spindle axis, and said angle having a vertex directed toward the work, said pulling means including a pair of pins respectively extending into said slots for acting through the latter on said levers for turning the latter as well as displacing the latter and said mounting means therewith in the direction of the spindle axis.

4. In a work holder as recited in claim 3, said pulling means including a carrier member carrying said pins and also carrying a third pin which extends across the spindle axis, and said pulling means including a pull rod assembly formed with an opening receiving said third pin, said latter opening having a substantially kidney-shaped configuration provided with a substantially straight portion on one side of said latter opening for engaging said third pin during pressing of said levers against the work and having a substantially V-shaped portion on the other side of said opening engaging said third pin during displacement of said levers to a position out of engagement with the work, so that said V-shaped portion of said pull rod assembly centers said third pin, said carrier member being freely tiltable to accommodate different degrees of displacement of said levers into engagement with the work.

5. In a work holder as recited in claim 4, spring means situated between said pair of mounting means and said carrier member to urging the latter away from said pair of mounting means.

6. In a work holder as recited in claim 1, said work-engaging members and said pair of mounting means extending completely across said opening of said work support means and completely filling said opening at least in one plane normal to the spindle axis so as to prevent chips, liquids, and the like from having access to the interior of said work support means.

7. In a work holder as recited in claim 6, said opening of said work support means having at least at the region thereof which accommodates said pair of mounting means a cylindrical configuration, and said pair of mounting means each being in the form of a half cylinder, and said half cylinders having flat faces slidably engaging each other and formed with recesses having peripheries which extend along a circle, said work-engaging members being in the form of levers having circular portions respectively located in and filling said recesses so that said pair of half cylinders support said levers for turning movement, and said levers respectively having faces flush with said flat faces of said half cylinders and also slidably engaging each other.

8. In a work holder as recited in claim 7, said circular portions of said levers being formed with central openings respectively passing therethrough and said half cylinders respectively carrying pivot pins respectively extending into said openings of said levers to participate in the support of the latter for turning movement with respect to said pair of mounting means.

References Cited by the Examiner

UNITED STATES PATENTS

| 1,954,760 | 4/1934 | Weightman | 269—48.1 |
| 2,050,828 | 8/1936 | Buell | 279—106 |
| 2,596,453 | 5/1952 | Weidel | 269—49 |

ROBERT C. RIORDON, *Primary Examiner.*

LESTER M. SWINGLE, H. V. STAHLHUTH,
*Examiners.*